US011964293B2

(12) United States Patent
Sesser et al.

(10) Patent No.: US 11,964,293 B2
(45) Date of Patent: Apr. 23, 2024

(54) RIGID MOUNT ORBITOR SPRINKLER

(71) Applicant: Nelson Irrigation Corporation, Walla Walla, WA (US)

(72) Inventors: George L. Sesser, Hayden, ID (US); Craig B. Nelson, Walla Walla, WA (US)

(73) Assignee: NELSON IRRIGATION CORPORATION, Walla Walla, WA (US)

(*) Notice: Subject to any disclaimer, the term of this patent is extended or adjusted under 35 U.S.C. 154(b) by 0 days.

(21) Appl. No.: 16/898,539

(22) Filed: Jun. 11, 2020

(65) Prior Publication Data

US 2020/0298256 A1 Sep. 24, 2020

Related U.S. Application Data

(63) Continuation of application No. 15/946,382, filed on Apr. 5, 2018, now Pat. No. 10,864,534.

(60) Provisional application No. 62/547,989, filed on Aug. 21, 2017.

(51) Int. Cl.
*B05B 3/00* (2006.01)
*B05B 3/04* (2006.01)
*B05B 15/18* (2018.01)

(52) U.S. Cl.
CPC ............ *B05B 3/0486* (2013.01); *B05B 3/003* (2013.01); *B05B 3/008* (2013.01); *B05B 15/18* (2018.02)

(58) Field of Classification Search
CPC ....... B05B 3/0486; B05B 3/003; B05B 3/008; B05B 15/18
USPC ..................................................... 239/222.17
See application file for complete search history.

(56) References Cited

U.S. PATENT DOCUMENTS

| | | | |
|---|---|---|---|
| 2,151,214 | A | 3/1939 | Kramer |
| 2,186,786 | A | 1/1940 | Jensen |
| 2,622,927 | A | 12/1952 | Sarbu |
| 2,639,191 | A | 5/1953 | Hruby, Jr. |
| 3,009,648 | A | 11/1961 | Hait |
| 3,034,728 | A | 5/1962 | Hruby, Jr. |
| 3,091,400 | A | 5/1963 | Aubert |
| 4,487,368 | A | 12/1984 | Clearman |

(Continued)

FOREIGN PATENT DOCUMENTS

| | | |
|---|---|---|
| CN | 1324272 | 11/2001 |
| CN | 1089644 | 8/2002 |

(Continued)

OTHER PUBLICATIONS

Australian Examination Report No. 1 dated Feb. 6, 2020 issued in Australian Patent Application No. 2019206122, 6 pp.

(Continued)

*Primary Examiner* — Chee-Chong Lee
(74) *Attorney, Agent, or Firm* — NIXON & VANDERHYE P.C.

(57) ABSTRACT

A rigid mount orbitor sprinkler assembly incorporates a deflector plate configuration that is configured for both spinning/rotating motion as well as orbital or wobbling motion around the center of a spool assembly. The sprinkler incorporates structure to reduce drool that may fall in a concentrated area below the sprinkler and to prevent debris from sandy water or the like from accelerating sprinkler component wear. With reduced vibration, the assembly may be rigidly mounted on a center pivot or other supporting structure while achieving the advantages associated with wobbling and rotating sprinkler assemblies.

10 Claims, 22 Drawing Sheets

(56) References Cited

U.S. PATENT DOCUMENTS

| | | | | |
|---|---|---|---|---|
| 4,802,628 | A | 2/1989 | Dautel | |
| 5,381,960 | A * | 1/1995 | Sullivan | B05B 3/008 239/222.17 |
| 5,439,174 | A | 8/1995 | Sweet | |
| 5,588,595 | A | 12/1996 | Sweet et al. | |
| 5,671,885 | A | 9/1997 | Davisson | |
| 5,950,927 | A | 9/1999 | Elliott et al. | |
| 6,176,440 | B1 * | 1/2001 | Elliott | B05B 3/0445 239/222.21 |
| 6,186,414 | B1 | 2/2001 | Clearman et al. | |
| 6,199,771 | B1 | 3/2001 | Clearman | |
| 6,382,525 | B1 * | 5/2002 | Santiesteban | B05B 1/265 239/222.11 |
| 6,439,477 | B1 | 8/2002 | Sweet et al. | |
| 6,932,279 | B2 | 8/2005 | Burcham | |
| 7,942,345 | B2 | 5/2011 | Sesser | |
| 8,991,724 | B2 | 3/2015 | Sesser | |
| 2008/0017732 | A1 | 1/2008 | Perkins et al. | |

FOREIGN PATENT DOCUMENTS

| | | |
|---|---|---|
| CN | 104069967 | 9/2017 |
| WO | WO 00/03810 | 1/2000 |
| WO | WO 2010/019850 | 2/2010 |

OTHER PUBLICATIONS

European Extended Search Report dated Feb. 7, 2020 issued in European Patent Application No. 19191088.4, 9 pp.

U.S. Office Action dated Mar. 26, 2020 issued in U.S. Appl. No. 16/118,718, 16 pp.

Chinese Office Action dated Apr. 6, 2021 issued in Chinese Patent Application No. 201910812670.6 and English translation, 15 pp.

Chinese Office Action dated Apr. 27, 2021 issued in Chinese Patent Application No. 201810947019.5 and English translation, 37 pp.

Australian Examination Report No. 1 dated Apr. 26, 2021 issued in Australian Patent Application No. 2019261755, 4 pp.

https://www.senninger.com/senninger-timeline,, "2003 Senninger introduces the Xi-Wob® to allow Wobbler technology's use on semi-rigid, PE and steel drop installations.," website pages, 23 pages, printed out on Feb. 24, 2022 (Jan. 2003).

https://www.potatogrower.com/2012/02/irrigation-buyers-guide, "Senninger Up3 Dual Nozzle Carrier," website pages, 19 pages, printed out on Feb. 24, 2022 (Feb. 2012).

* cited by examiner

RIGID MOUNT ORBITOR SPRINKLER

CROSS-REFERENCES TO RELATED APPLICATIONS

This application is a continuation of U.S. patent application Ser. No. 15/946,382, filed Apr. 5, 2018, pending, which claims the benefit of U.S. Provisional Patent Application No. 62/547,989, filed Aug. 21, 2017, the entire contents of each of which are hereby incorporated by reference in this application.

STATEMENT REGARDING FEDERALLY SPONSORED RESEARCH OR DEVELOPMENT (Not Applicable)

BACKGROUND

The invention relates to a rotating/wobbling sprinkler assembly and, more particularly, to a sprinkler that can be rigidly mounted on a center pivot (or other support structure) that disperses water using a spinning or rotating deflector plate and with orbital motion of the deflector plate assembly.

Moving irrigation systems such as conventional pivot or linear systems are known to incorporate conduit truss span assemblies that mount sprinkler heads, spaced along the truss assemblies for sprinkling or irrigating relatively large areas of land. The sprinkler heads may be mounted on top of the truss assemblies in a normal upright position, or they may be inverted and suspended from the span assemblies by means of drop tubes. Sprinkler heads are typically of the spinner type, which incorporate rotatable stream distributors (also referred to as rotor plates or spray plates, fixed spray plates or bubbler devices).

When irrigating large areas of land with pivot or linear sprinklers, the sprinklers need to be spaced apart as far as possible to minimize system hardware costs. Obtaining an even distribution of the water at wide spacings requires sprinklers that simultaneously throw the water long distances and produce sprinkling patterns that are even when overlapped with adjacent sprinklers. These two requirements are somewhat exclusive in that maximum radius of throw is achieved with concentrated streams of water shooting at relatively high trajectory angles. These streams, however, tend to produce a donut-shaped sprinkling pattern at low pressure that does not overlap evenly. The use of nutating or wobbling sprinklers to enhance distribution uniformity particularly at low pressure is known in the art, as evidenced, for example, by U.S. Pat. Nos. 5,439,174; 5,671,885; 5,588,595; 5,950,927; 6,439,477; and 6,932,279. Wobbling type sprinklers can be problematic, however, in the sense that in some circumstances, the sprinkler simply rotates on its center axis without wobbling. This is particularly true if the sprinkler rotor plate is allowed to assume an on-center orientation when at rest.

There is a need for a sprinkler that can be rigidly mounted on a center pivot (or other support structure) that disperses the water in a combined rotating and wobbling manner. The existing designs have to be mounted on a damping device such as a 2' minimum length drop hose to isolate the structure from the damaging vibration. Orbiting (or nutating or wobbling) sprinklers normally operate in the range of 1000-2400 orbits/min. The load from the deflected stream reverses direction at that speed, thus being the primary cause of vibration, but the mass and balance of the orbiting parts also affect the vibration. The magnitude of the vibration that reaches the structure is important, but it is also important that the frequency of the vibration not match up with the resonant frequency of the structure.

BRIEF SUMMARY

A rigid mount orbitor sprinkler assembly incorporates a deflector plate configuration that is configured for both spinning/rotating motion as well as orbital or wobbling motion around the center of a spool assembly. The sprinkler incorporates structure to reduce drool that may fall in a concentrated area below the sprinkler and to prevent debris from sandy water or the like from accelerating sprinkler component wear. With reduced vibration, the assembly may be rigidly mounted on a center pivot or other supporting structure while achieving the advantages associated with wobbling and rotating sprinkler assemblies.

In an exemplary embodiment, a sprinkler includes a sprinkler body, a nozzle associated with one end of the sprinkler body, and a cap secured to or integral with an opposite end of the sprinkler body. The cap includes a central opening. A deflector plate assembly supported by the cap includes a deflector plate at an upstream end facing the nozzle, a spool assembly supported in the central opening of the cap, and a counterbalance weight at a downstream end. The deflector plate assembly is pitched at an angle relative to the sprinkler body. The cap may include traction surfaces surrounding the central opening on both sides thereof, and the spool assembly may include a pair of flanges positioned on opposite sides of the cap, where the pair of flanges engage the traction surfaces of the cap, respectively.

The traction surfaces may be defined by traction bars and debris pockets between the traction bars, where the traction bars and debris pockets are positioned circumferentially around the central opening of the cap. The spool assembly may further include a bushing separating the pair of flanges. The bushing may include a circumferential indentation. In some embodiments, the spool assembly may include a spool shaft disposed between a pair of facing spool shoulders, and the pair of flanges may be respectively positioned adjacent each of the pair of spool shoulders and on the spool shaft. The spool assembly may further include a bushing positioned on the spool shaft and separating the pair of flanges. The pair of flanges may include respective integral bushing halves in abutting engagement on the spool shaft. In some embodiments, each of the pair of flanges may be formed of an elastomer material. The counterbalance weight may be displaceable within a housing between a high-speed extended position and a low-speed retracted position. In this context, the counterbalance weight may be biased toward the low-speed retracted position by a spring. The housing may be coupled with a distal end of the spool assembly. The counterbalance weight may be disposed in a housing coupled with a distal end of the spool assembly. In this context, the housing may further include fan blades. The sprinkler may additionally include a cover positioned over the deflector plate assembly and secured to the sprinkler body. The cover includes a pitch member disposed facing the housing, where the housing may include a tab member at a distal end, the pitch member and the tab member cooperating to pitch the deflector plate assembly at the angle relative to the sprinkler body. The counterbalance weight of the deflector plate assembly may be bottommost relative to gravity, where the housing includes exterior fins that taper outwardly from top to bottom. The deflector plate assembly may further include a shield member positioned on a downstream side of the deflector plate, where the shield member prevents debris from reaching the spool assembly. In some embodiments, the shield member defines an upstream side of the spool assembly. The shield member may include impeller blades. The sprinkler may be provided with a start-up rib or lip disposed adjacent an inside diameter of the central opening.

In another exemplary embodiment, a sprinkler includes a sprinkler body having a longitudinal axis, a cap secured to or integral with the sprinkler body and including a central opening, a nozzle, and a deflector plate assembly including a deflector plate at one end disposed facing the nozzle, a counterbalance weight disposed at an opposite end, and a spool assembly positioned in the central opening and disposed between the deflector plate and the counterbalance weight. The cap may include traction surfaces surrounding the central opening. The spool assembly may include elastomeric flanges engageable with the traction surfaces, and the traction surfaces may include traction bars and debris pockets between the traction bars. The traction bars and debris pockets may be positioned circumferentially around the central opening of the cap. The deflector plate assembly may be rotatable about a rotation axis, and the deflector plate assembly may be supported in the sprinkler body such that the rotation axis is pitched relative to the longitudinal axis and such that deflector plate assembly is configured to wobble about the longitudinal axis.

In yet another exemplary embodiment, a sprinkler includes a sprinkler body, a nozzle, a cap secured to or integral with a distal end of the sprinkler body and including a central opening, and a deflector plate assembly supported in the central opening of the cap. The deflector plate assembly may include a deflector plate member at an upstream end having a deflector plate on an upstream side facing the nozzle and splined shaft on a downstream side; a spool assembly supported in the central opening of the cap, the spool assembly including an upstream spool shoulder secured over the splined shaft; an upstream elastomer flange positioned adjacent the upstream spool shoulder; a bushing engaging the upstream spool shoulder; a downstream spool shoulder connected to the splined shaft and engaging the bushing; and a downstream elastomer flange positioned adjacent the downstream spool shoulder and facing the bushing. A bolt may be secured through the downstream spool shoulder into the splined shaft of the deflector plate member. Additionally, a counterbalance weight assembly at a downstream end may be secured to the downstream spool shoulder. The bushing may be integral with the upstream and downstream elastomer flanges.

BRIEF DESCRIPTION OF THE DRAWINGS

These and other aspects and advantages will be described in detail with reference to the accompanying drawings, in which.

DETAILED DESCRIPTION

Figure 1:
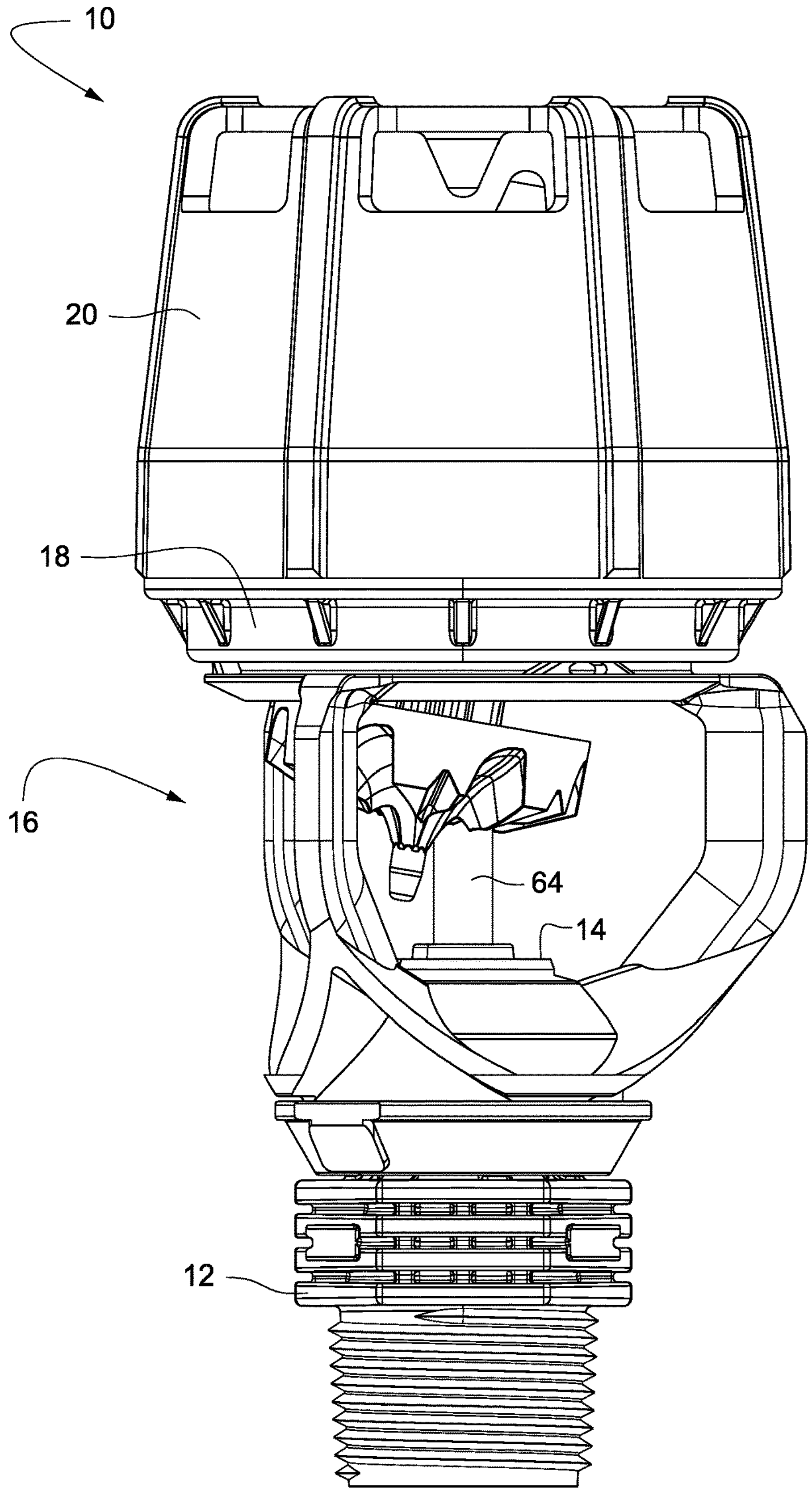
FIG. 1 shows an assembled sprinkler head of a first embodiment.
Figure 2:
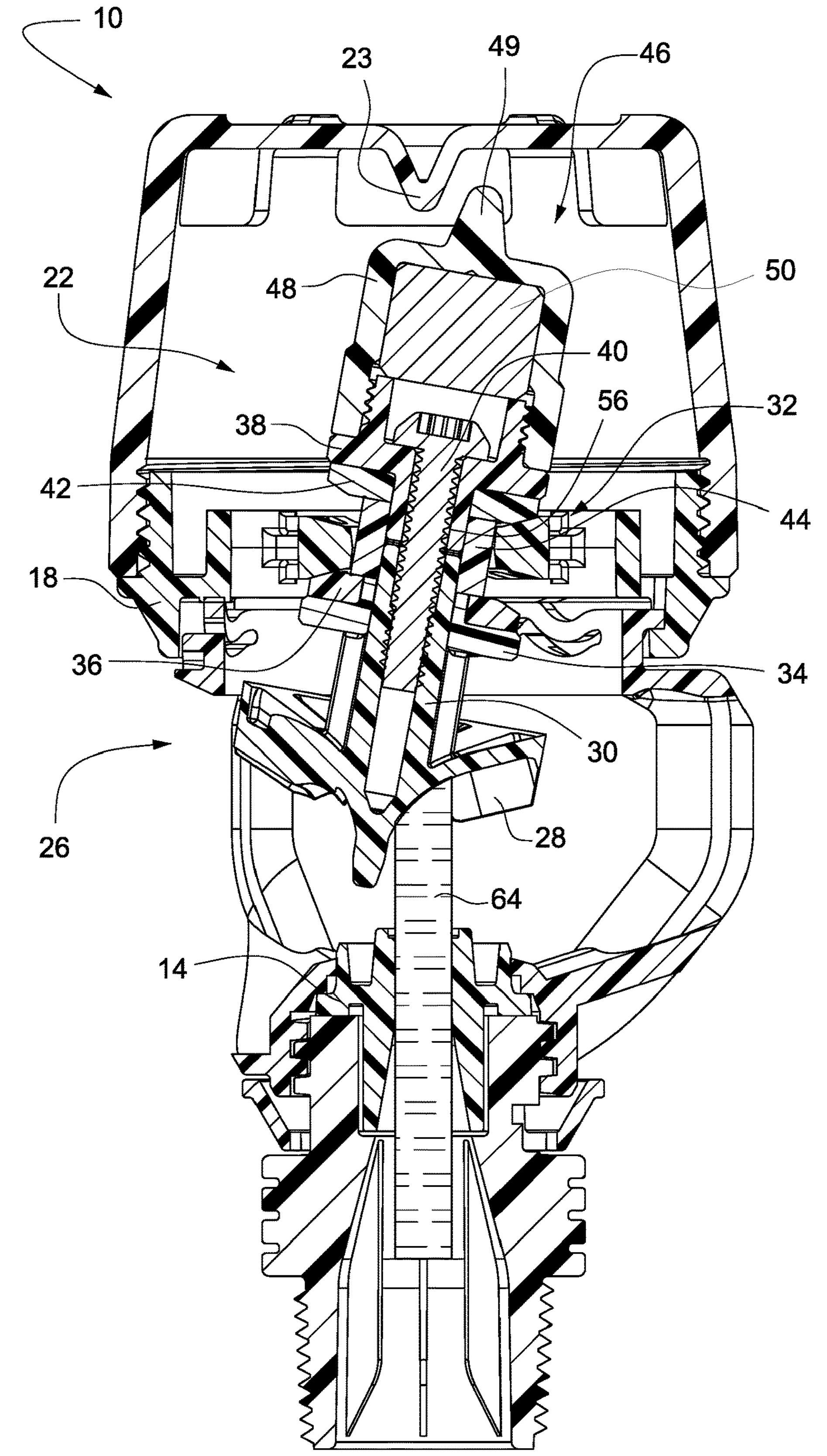
FIGS. 2 and 3 are cross-sectional views of the sprinkler head of FIG. 1.
Figure 3:
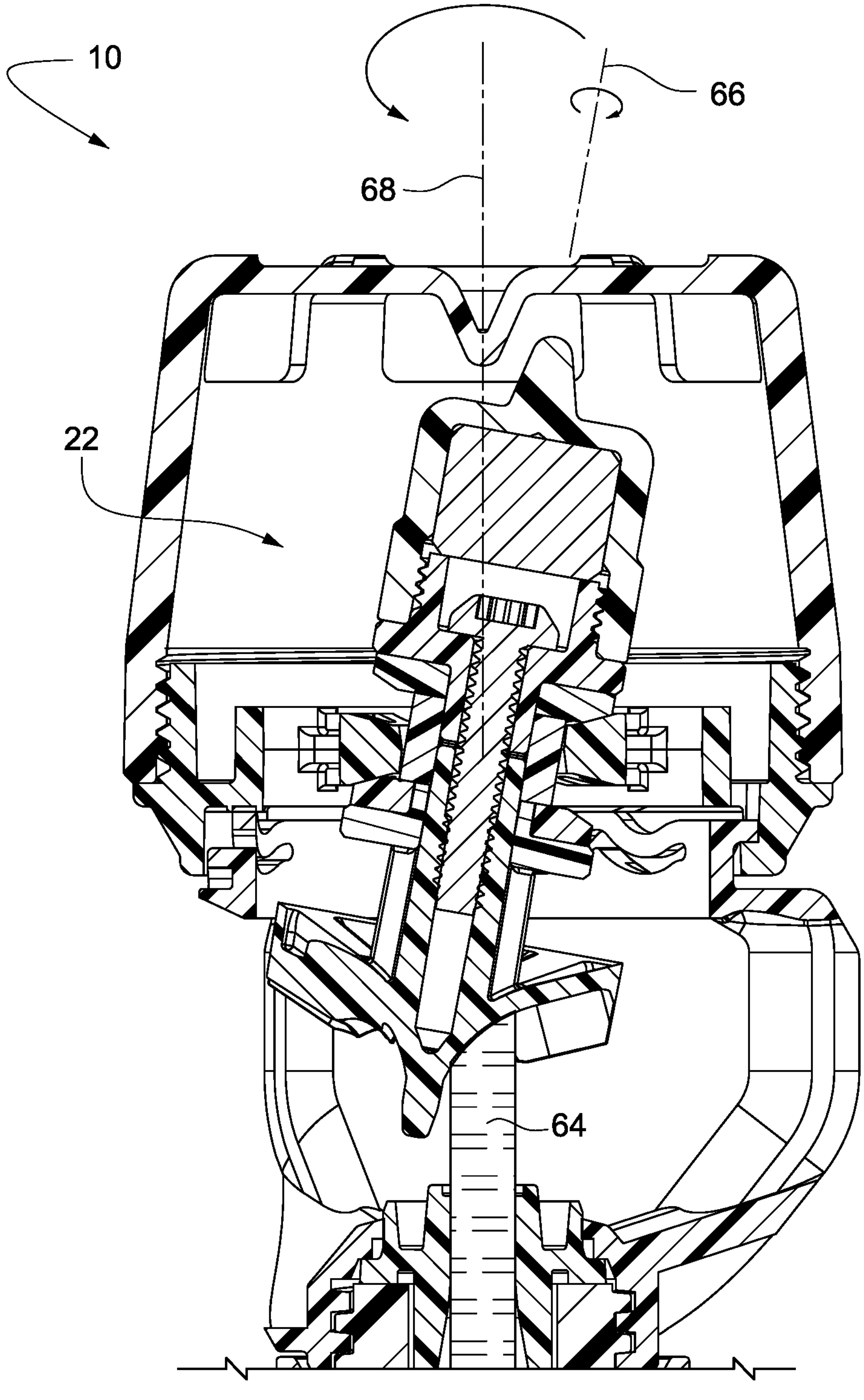
Figure 13:
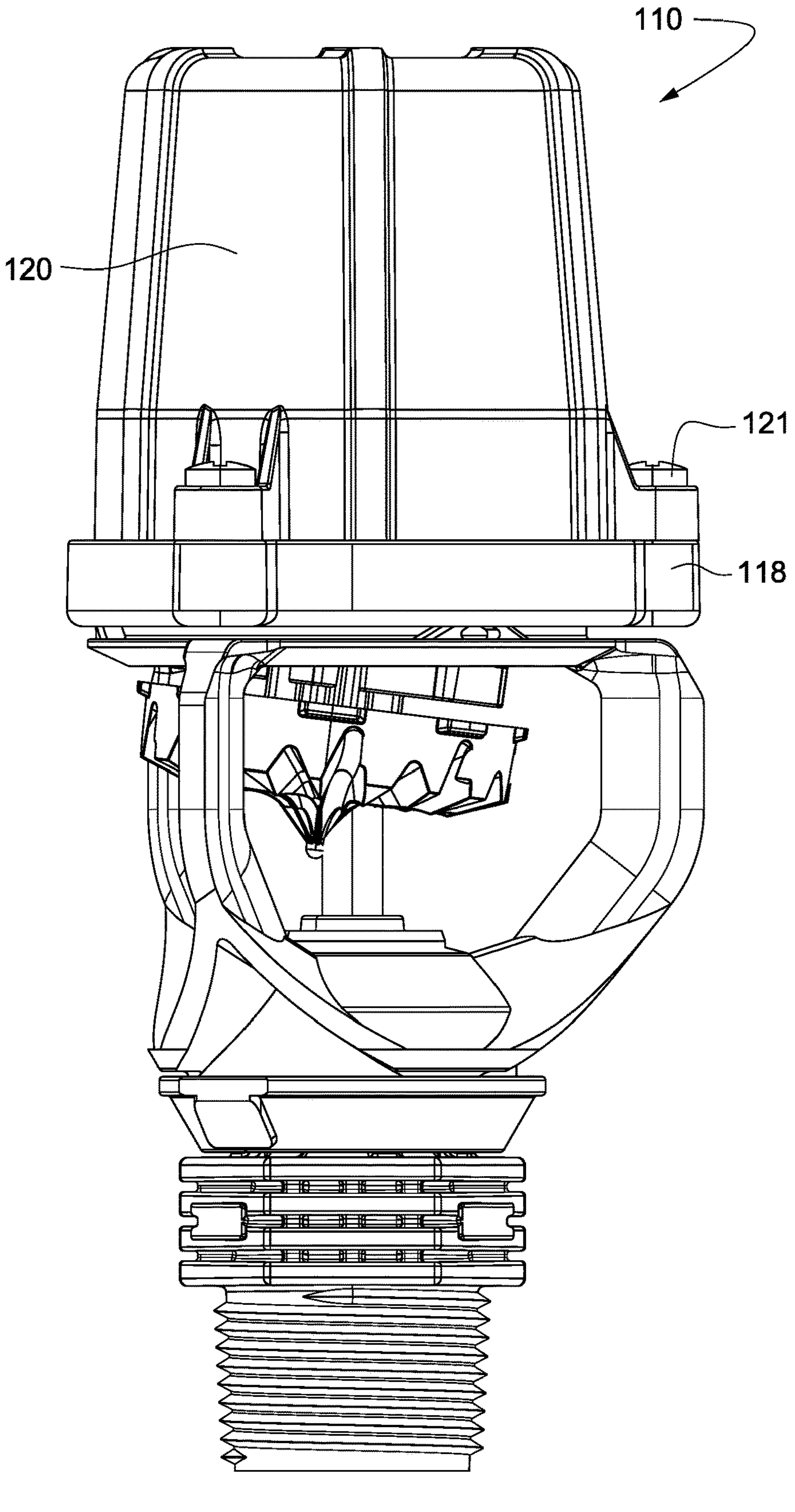
FIG. 13 shows an alternative embodiment of the sprinkler head.

FIGS. 1-3 show a rigid mount orbiter sprinkler assembly 10 according to one embodiment. The assembly 10 is connectable to a source of water under pressure via an inlet 12. The inlet 12 may be threaded or otherwise securely connected to the water source (not shown). Water flow is directed through a nozzle 14 secured in a sprinkler body 16. A central support 18 is connected with the sprinkler body 16, and a cover 20 is secured to the central support 18. The central support 18 may also be referred to as a cap 18. The cap 18 may be secured to the sprinkler body 16 in any suitable manner, which includes being formed integral with the sprinkler body 16. In some embodiments, the cap 18 includes locking structure 19 (see FIG. 6) for a twist lock or bayonet-type lock to complementary components on the sprinkler body 16. The cap 18 may also include threads 21 for securing the sprinkler head cover 20. The cap 18 may alternatively be secured to the body 16 with screws or the like (see e.g., FIG. 13).

With reference to FIGS. 2, 3 and 6-10, a deflector plate assembly 22 is supported for rotation/spinning and orbital motion in a central opening 24 (see FIG. 6) in the cap 18. The deflector plate assembly 22 includes a deflector plate member 26 at an upstream end having a deflector plate 28 on an upstream side facing the nozzle 14 and a splined shaft 30 on a downstream side. As shown in more detail in FIG. 7, the deflector plate 28 of the deflector plate member 26 includes lands and grooves that are configured to disperse water impacting the deflector plate 28 in a predefined pattern and to impart rotation and orbital motion of the deflector plate assembly 22 by impact with the water stream.

The deflector plate assembly 22 also includes a spool assembly 32 supported in the central opening 24 of the cap 18. The spool assembly includes an upstream spool shoulder 34 secured over the splined shaft 30 of the deflector plate member 26. An upstream flange 36 is positioned adjacent the upstream spool shoulder 34. A downstream spool shoulder 38 is connected to the splined shaft 30 by a bolt 40 or the like. A downstream flange 42 is positioned adjacent the downstream spool shoulder 38. The flanges 36, 42 may be provided with lugs or splines to engage and rotate with the upstream 34 and downstream 38 spool shoulders. A bushing 44 engages the upstream 34 and downstream 38 spool shoulders and is interposed between the flanges 36, 42.

The deflector plate assembly 22 also includes a counterbalance weight assembly 46 at a downstream end. The counterbalance weight assembly 46 includes a housing 48 secured to the downstream spool shoulder 38 and a counterbalance weight 50 disposed in the housing 48.

As shown, the deflector plate assembly 22 is pitched at an angle relative to the sprinkler body 16. The cover 20 may be provided with a pitch member 23 disposed facing the housing 48. The housing 48 may be provided with a tab member 49 at a distal end. The pitch member 23 and the tab member 49 cooperate to maintain the deflector plate assembly 22 in the central opening 24 at the angle relative to the sprinkler body 16.

Figure 8:
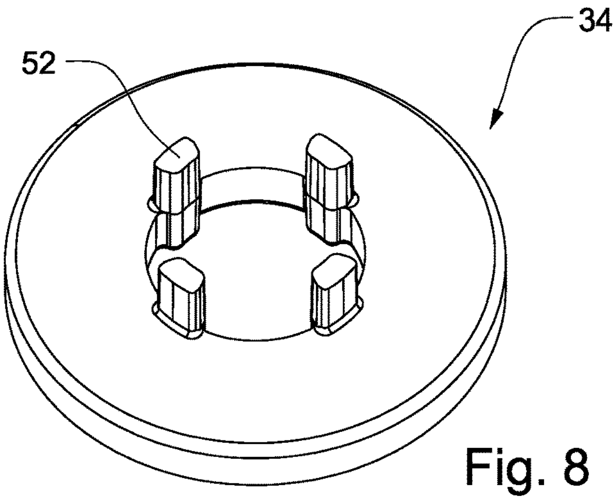
Figure 9:
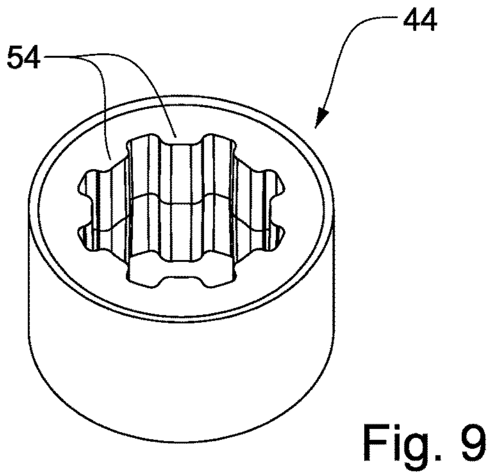
Figure 10:
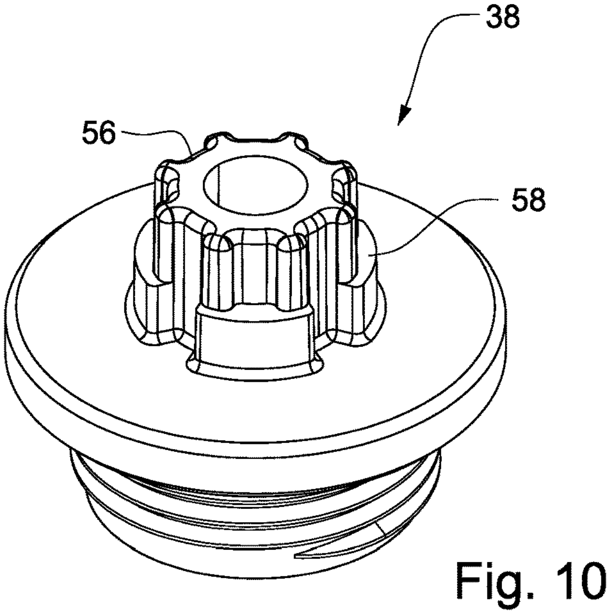

Parts of the deflector plate assembly 22 are shown in FIGS. 6-10. FIG. 8 shows the upstream spool shoulder 34, which includes lugs 52 for engaging the splined shaft 30 of the deflector plate member 26. As shown, the lugs 52 protrude (upwardly in FIG. 8) to engage the bushing 44. With reference to FIG. 9, the bushing 44 similarly includes lugs 54 for engaging the splined shaft 30 of the deflector plate member 26. With reference to FIG. 10, the downstream spool shoulder 38 includes a shaft 56 that is splined generally corresponding to the splined shaft 30 of the deflector plate member 26. As shown in FIGS. 2 and 3, the downstream spool shoulder 38 may be abutted against and aligned with the splined shaft 30. Together, the splined shaft 30 and the shaft 56 of the downstream spool shoulder 38 define a spool shaft between the facing spool shoulders 34, 38. Lugs 58 are provided around the shaft 56 and are positioned to engage the bushing 44 when assembled. In some embodiments, the upstream spool shoulder 34, the downstream spool shoulder 38 and the bushing 44 are molded from hard plastic, and the upstream flange 36 and the downstream flange 42 are formed of an elastomer or other pliable material. When assembled, the bolt 40 compresses the components together with the bushing 44 engaged by the hard plastic lugs 52 and 58 of the respective upstream 34 and downstream 38 spool shoulders so as not to overly compress and distort the elastomer flanges 36, 42 while securing the flanges in place.

Figure 6:
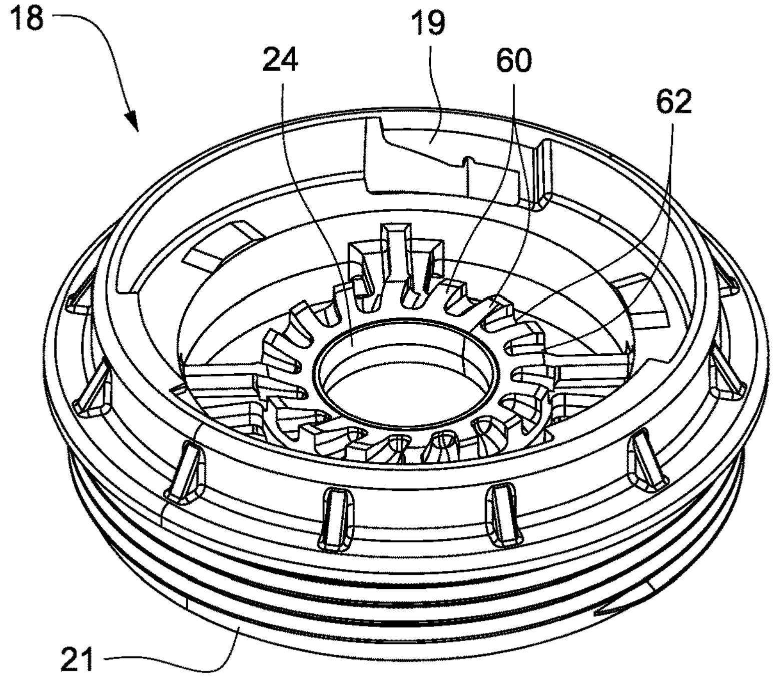
FIGS. 6-10 are perspective views of various parts of the assembly.
Figure 7:
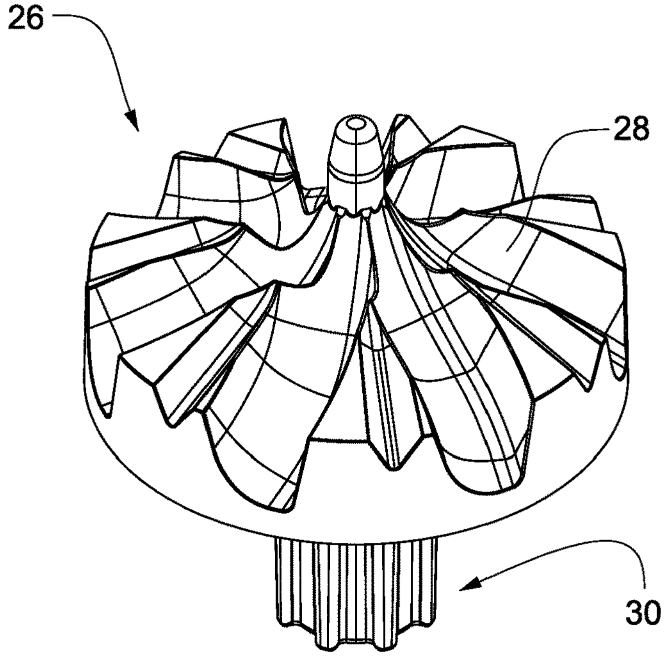

With reference to FIGS. 2, 3 and 6, the cap 18 is provided with traction surfaces surrounding the central opening 24. In particular, the traction surfaces may include traction bars 60 and debris pockets 62 interposed between the traction bars 60 and positioned circumferentially around the central opening 24 of the cap 18. In use, the flanges 36, 42, which are preferably formed of a soft elastomer material, engage the traction surfaces to facilitate rotation of the deflector plate assembly 22. That is, the flanges 36, 42 are driven into engagement with the traction bars 60 for a secure grip. The debris pockets 62 serve to accumulate any debris such as sand or the like that may get into the spool assembly 32. The accumulated debris in the debris pockets 62 will ultimately work its way out during use.

In operation, a water stream 64 is emitted from the nozzle 14 and impacts the deflector plate 28 of the deflector plate assembly 22. As the water stream 64 impacts the deflector plate 28, the deflector plate assembly 22 is caused to rotate or spin about its longitudinal axis or rotation axis 66 (FIG. 3). Additionally, because the deflector plate assembly 22 is pitched relative to the sprinkler body by the spool assembly 32 supported in the central opening 24 of the cap 18, the deflector plate assembly 22 is also caused to wobble by orbital motion around a central axis 68 of the spool assembly 32.

Figure 4:
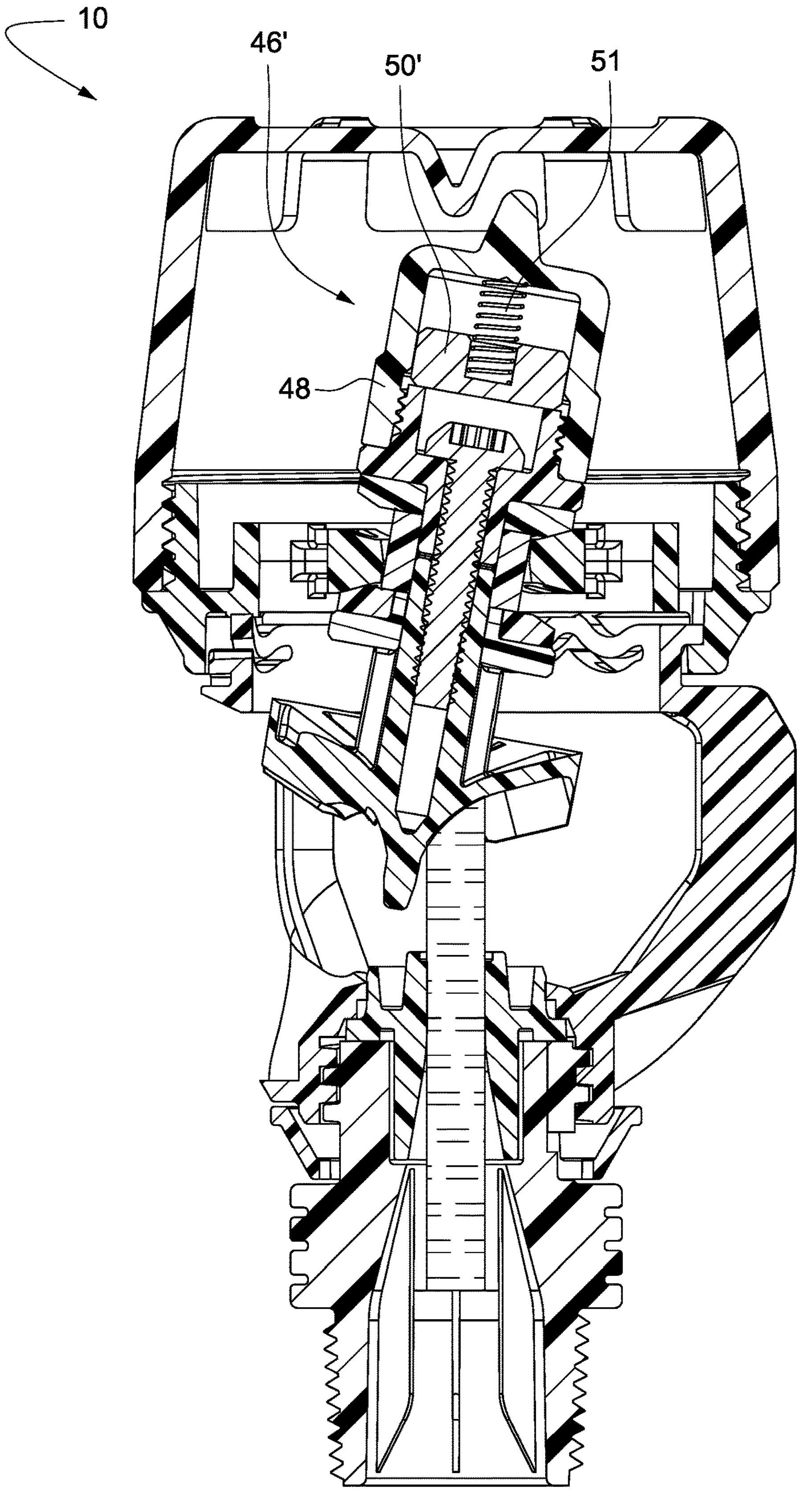
FIGS. 4 and 5 show a variation of the counterbalance weight.
Figure 5:
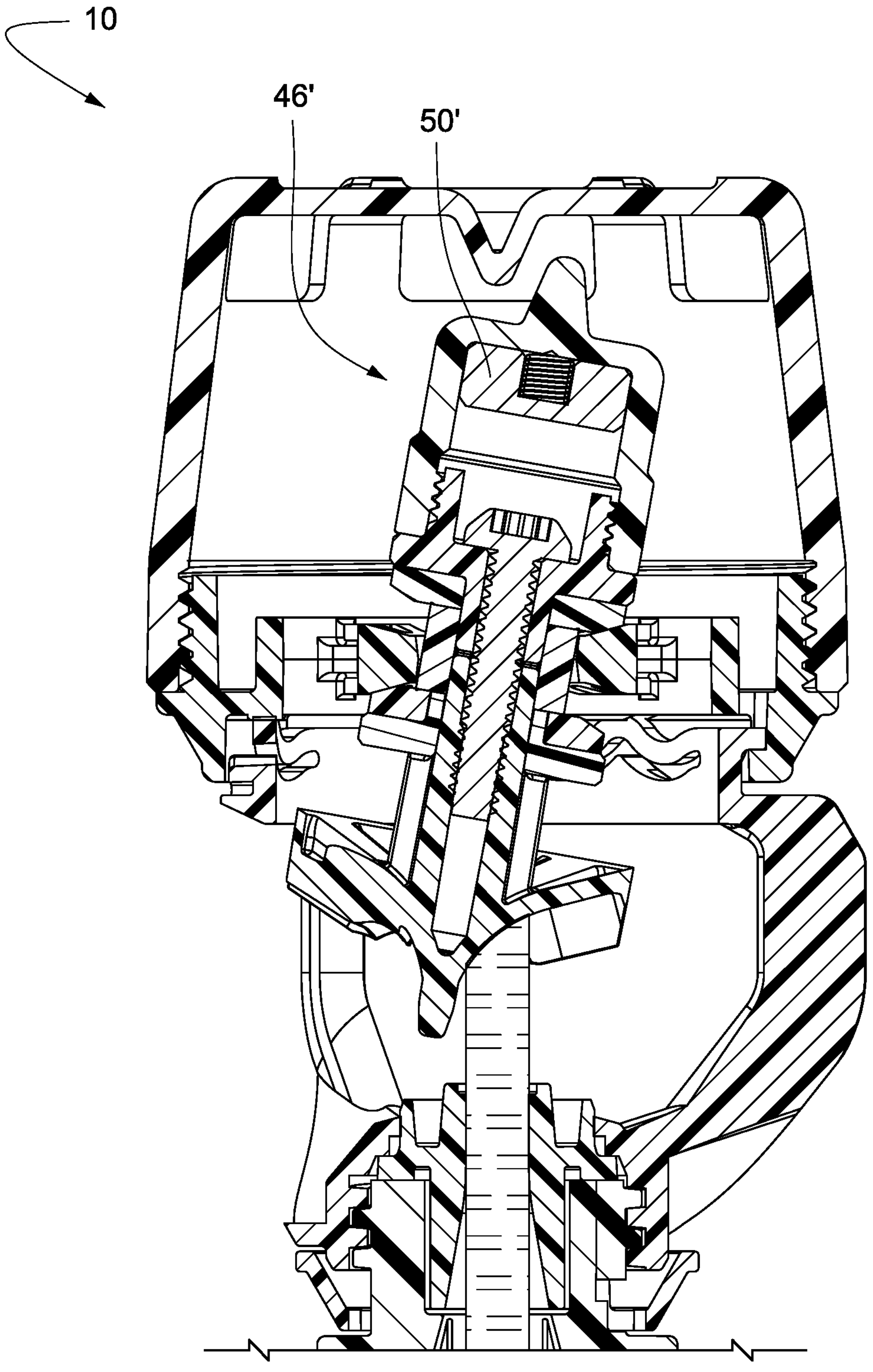

FIGS. 4 and 5 show a variation of the counterbalance weight assembly 46'. As shown, the counterbalance weight 50' is displaceable in the housing 48 between a low-speed retracted position (FIG. 4) and a high-speed extended position (FIG. 5). A spring 51 is interposed between the counterbalance weight 50' and the housing 48 and biases the counterbalance weight 50' toward the low-speed retracted position. In use, as the orbital motion speed of the deflector plate assembly 22 increases (i.e., orbital motion or wobble about axis 68), the counterbalance weight 50' is displaced toward the high-speed extended position against the force of the spring 51. Deflection of the counterbalance weight 50' will slow the orbital motion speed until the counterbalance weight 50' reaches the high-speed extended position (adjacent an outermost wall of the housing 48 as shown in FIG. 5).

Figure 11:
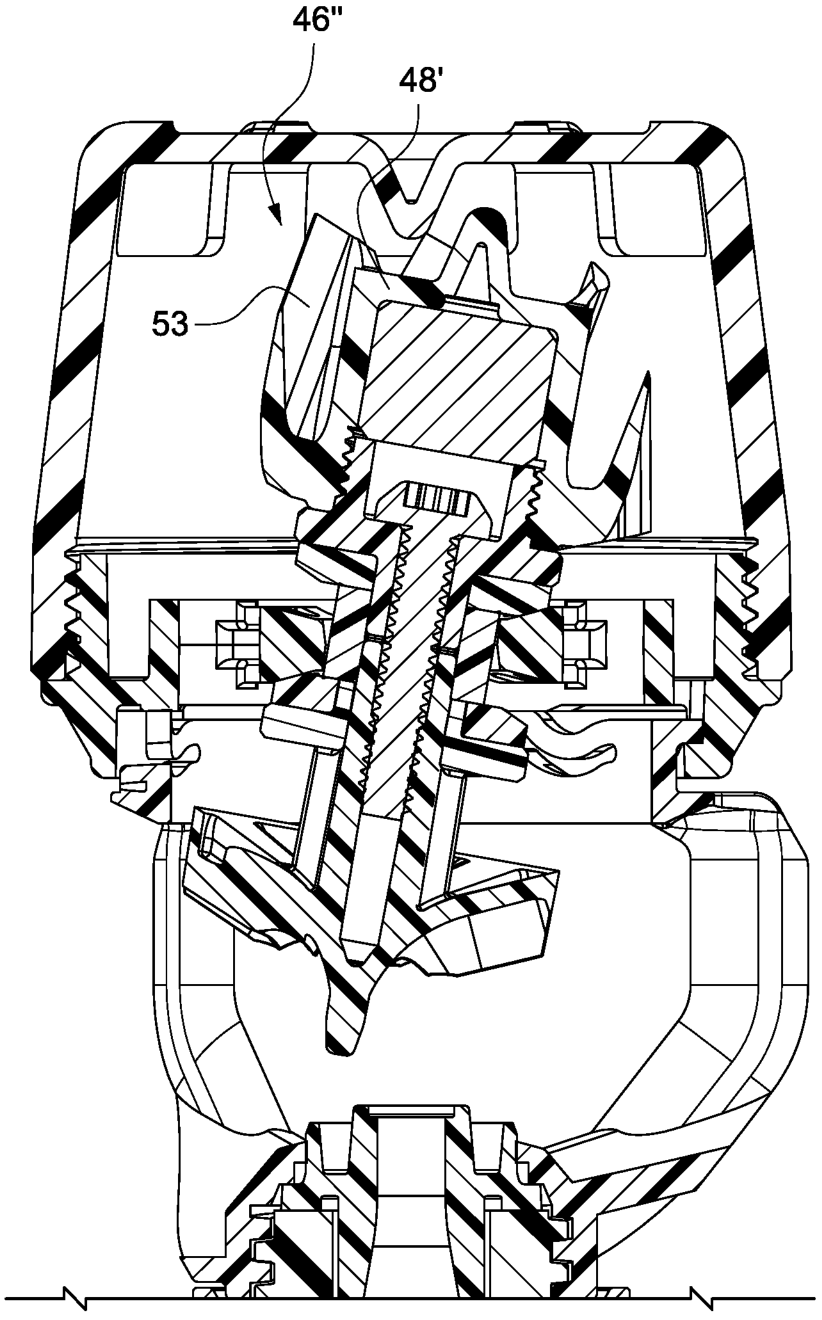
FIGS. 11 and 12 show a variation of the counterbalance weight housing.
Figure 12:
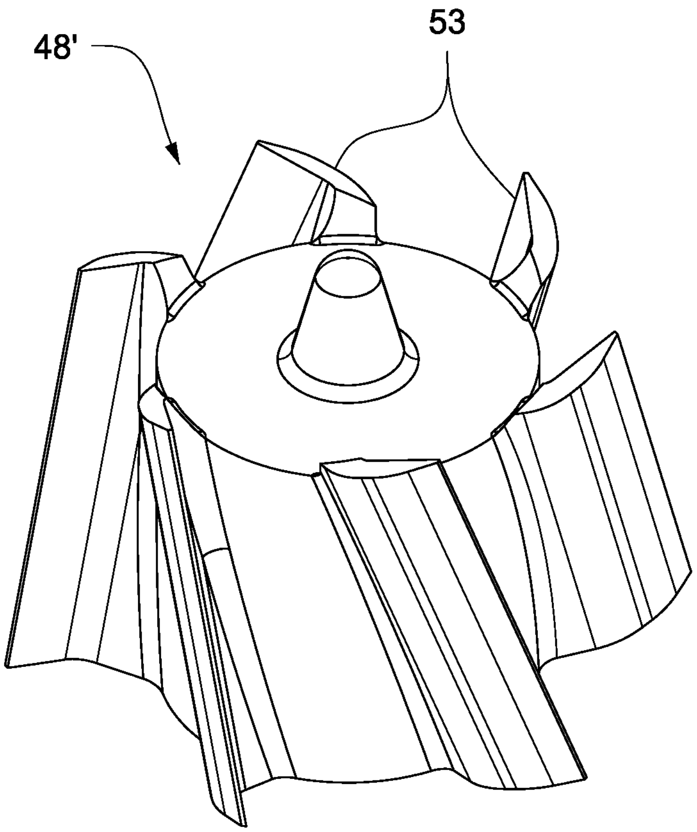

FIGS. 11 and 12 show yet another variation of the counterbalance weight assembly 46". In this variation, the housing 48' is provided with fan blades 53. The fan blades 53 act as dampers (e.g., air dampers) to slow the orbital motion of the deflector plate assembly 22 about axis 68.

Figure 14:
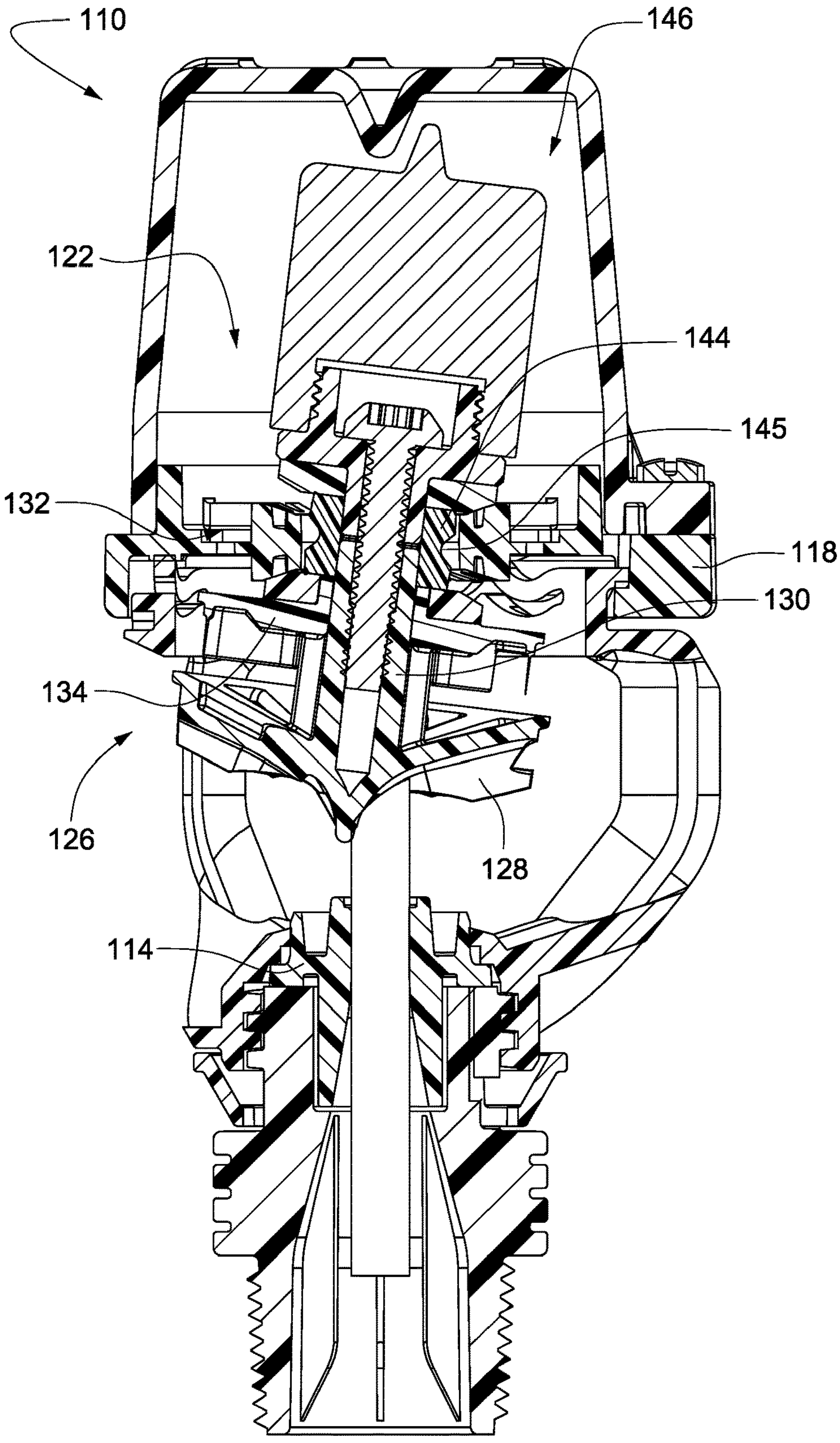
FIGS. 14 and 15 are cross-sectional views of the sprinkler head of FIG. 13.
Figure 15:
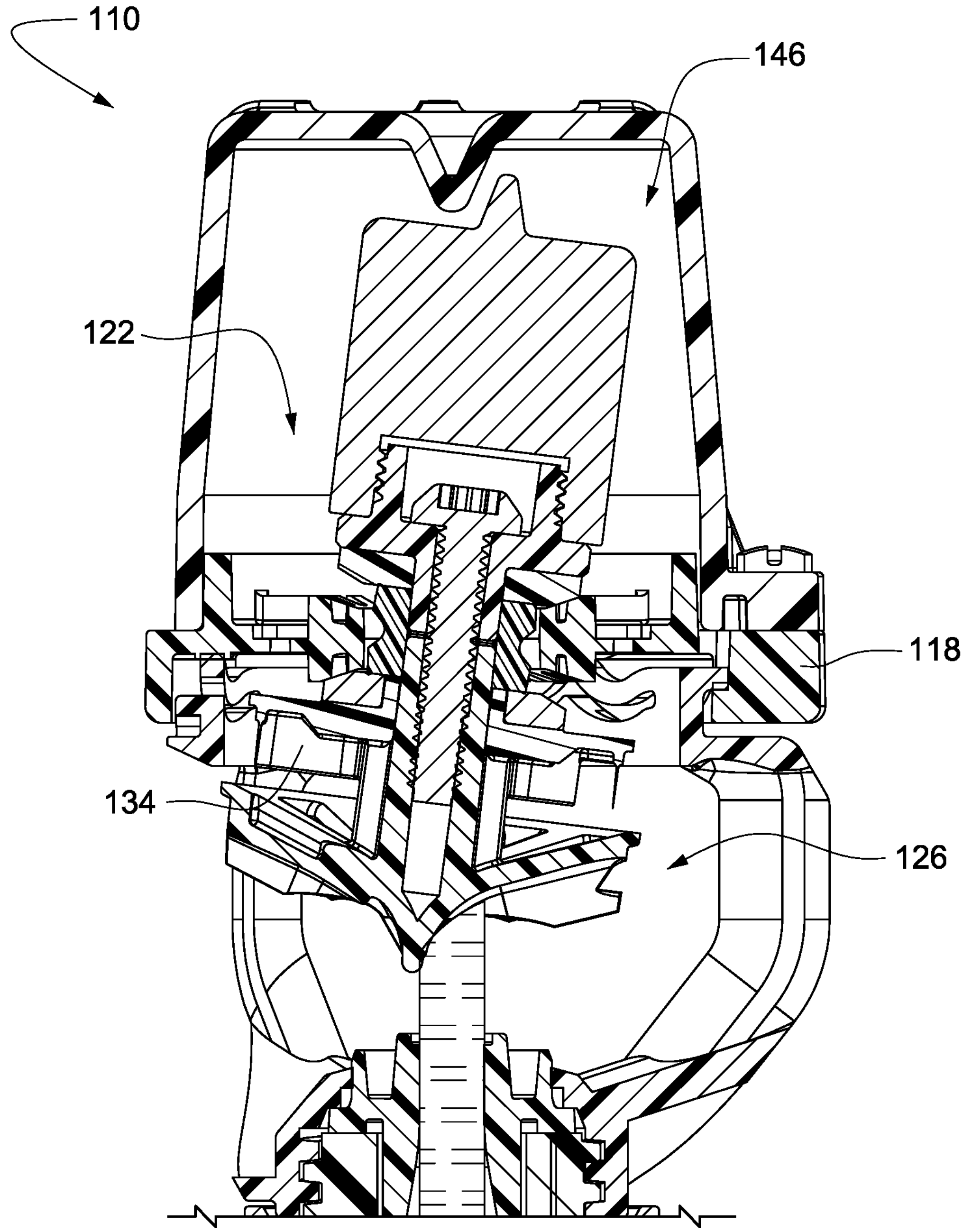
Figure 16:
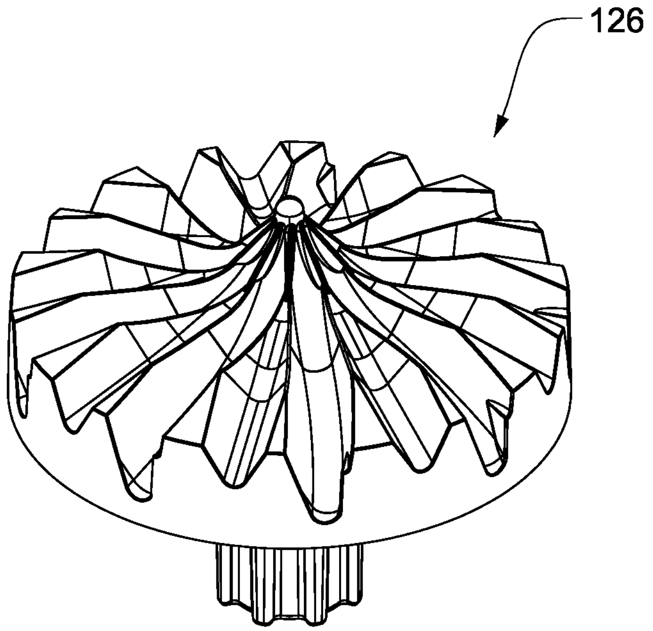
FIGS. 16-18 are perspective views of the FIG. 13 sprinkler head components.
Figure 17:
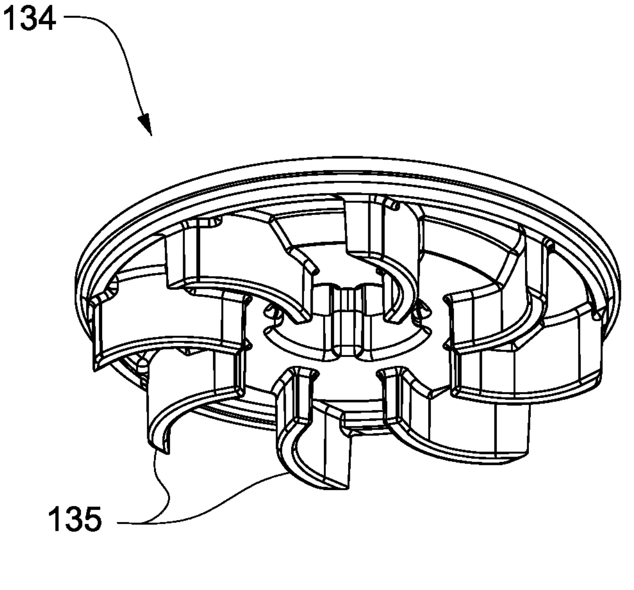

FIGS. 13-18 show a variation of the sprinkler head assembly 110. In this embodiment, the sprinkler head cover 120 is secured on the cap 118 by screws 121 or the like. As would be appreciated by those of ordinary skill in the art, this variation may be similarly applicable to the previously-described embodiments. With reference to FIGS. 14 and 15, the deflector plate assembly 122 includes a deflector plate member 126, a spool assembly 132 supported in the cap 118, and a counterbalance weight assembly 146. The upstream spool shoulder 134 defines a shield member positioned on the splined shaft 130 of the deflector plate member 126 on a downstream side of the deflector plate 128. The spool shoulder/shield member 134 includes a plurality of impeller blades/fingers 135. The blades/fingers 135 may be curved in any orientation such that the blades/fingers 135 may act as air damping impellers for damping rotation speed about both axes 66, 68 or they may act as flingers to throw residual water or drool that would normally drip in a concentrated area below the sprinkler. In either orientation, the member 134 serves to reduce the amount of abrasive particles that may reach the wear areas of the spool assembly 132 when running in sandy water conditions or the like. Sandy water from adjacent sprinklers may be deflected away from the spool assembly 132, and the blades 135 may be shaped to pull the abrasive particles and air into a hub area just above the deflector plate grooves.

Figure 18:
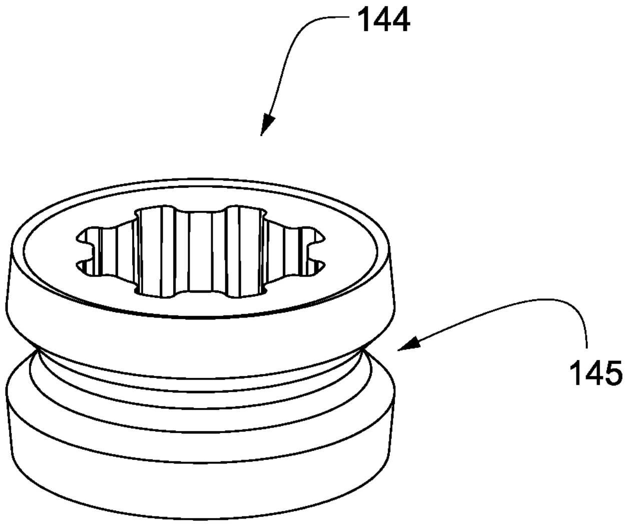

The bushing 144 may be provided with a relieved area or circumferential indentation 145 in its outside diameter (see FIG. 18). As shown, the indentation 145 may be provided in the center of the outside diameter of the bushing 144. The relieved area 145 gives sand particles and the like a place to go without jamming the spool assembly 132. Over time, debris build-up in the indentation 145 will slough off and out of the assembly due among other things to the orbital action of the deflector plate assembly 122.

In the embodiment shown in FIGS. 13-18, the tip angle of the deflector plate assembly 122 is reduced from the embodiment shown in FIG. 1 (e.g., from 10° to) 7°, and the center of motion has been shifted closer to the nozzle 114. A net effect of these adjustments is to reduce the generation of fine mist (that is blown away in the wind and becomes wasted water) and to reduce the magnitude of vibrations to thereby reduce wear on the spool components without sacrificing water distribution performance. As a result of the reduced vibration, the assembly can be balanced with less weight, which can significantly reduce manufacturing costs.

Figure 19:
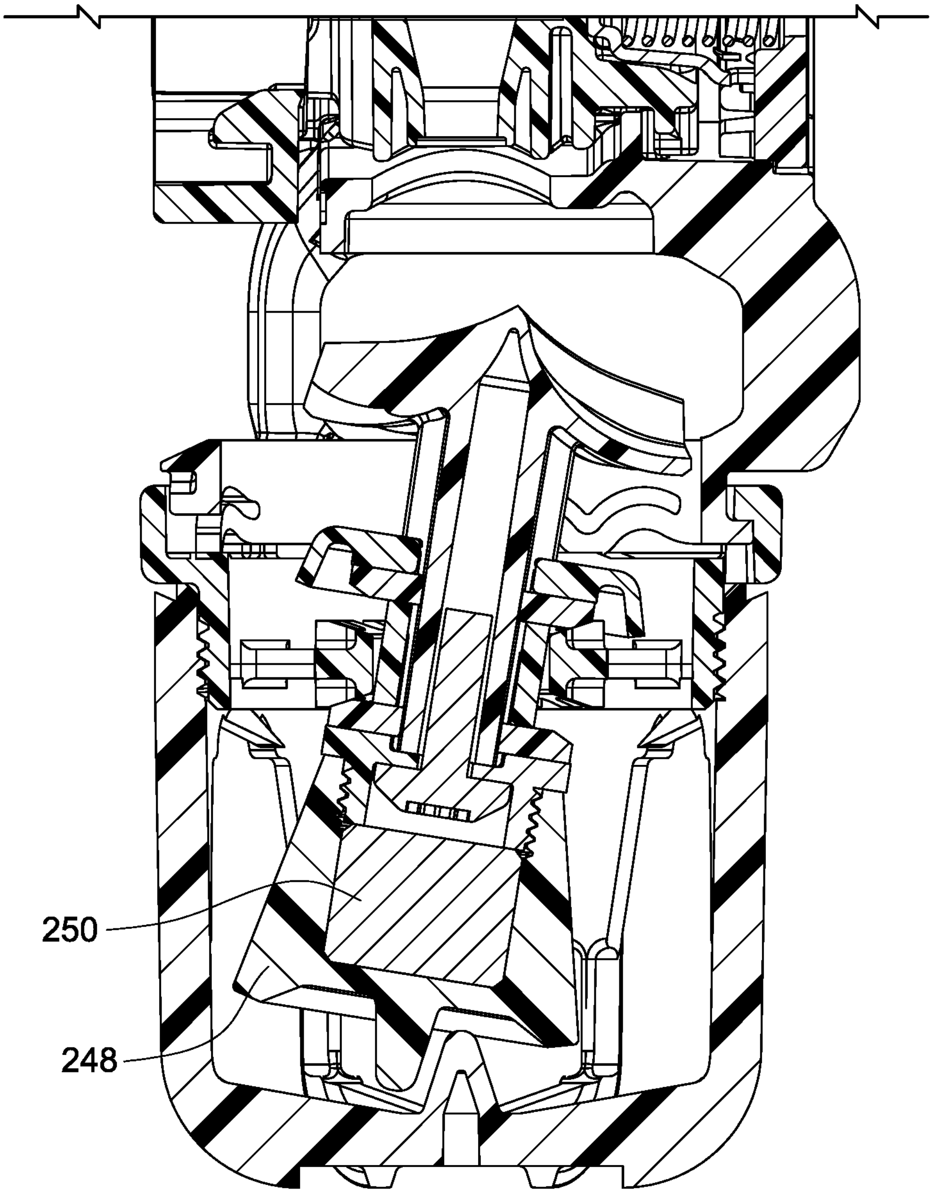
FIG. 19 shows a sprinkler head of an alternative embodiment for use on a drop tube.
Figure 20:
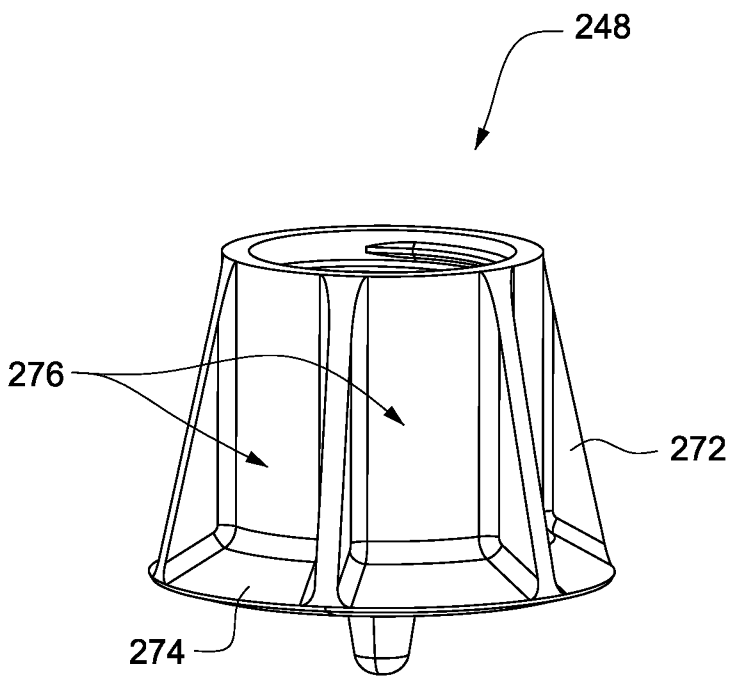
FIG. 20 is a perspective view of the counterbalance weight housing from the sprinkler head shown in FIG. 19.

FIGS. 19 and 20 show an embodiment for use on a drop tube, where the assembly is inverted such that the counterbalance weight cover 248 and the counterbalance weight 250 are bottommost relative to gravity. The housing 248 includes exterior fins 272 that taper outwardly from top to bottom. The fins 272 terminate at a circumferential lip 274 such that the fins 272 and lip 274 define compartments 276 around a periphery of the housing 248. With this construction, the housing 248 acts as a flinger to catch drool and fling it away from the sprinkler rather than letting it drop in concentrated fashion directly below the unit.

Figure 21:
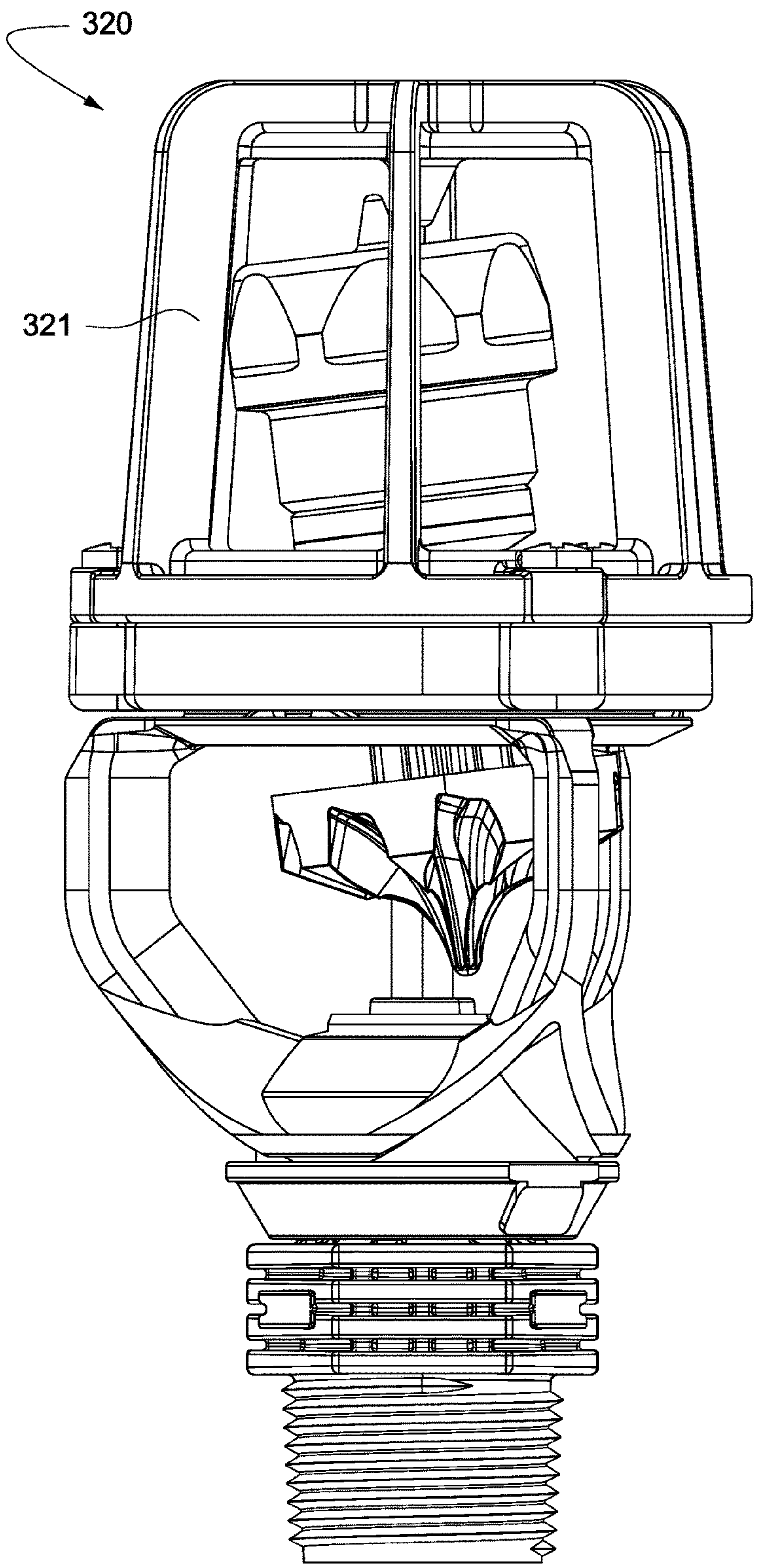
FIGS. 21-23 show a sprinkler head of another alternative embodiment.
Figure 22:
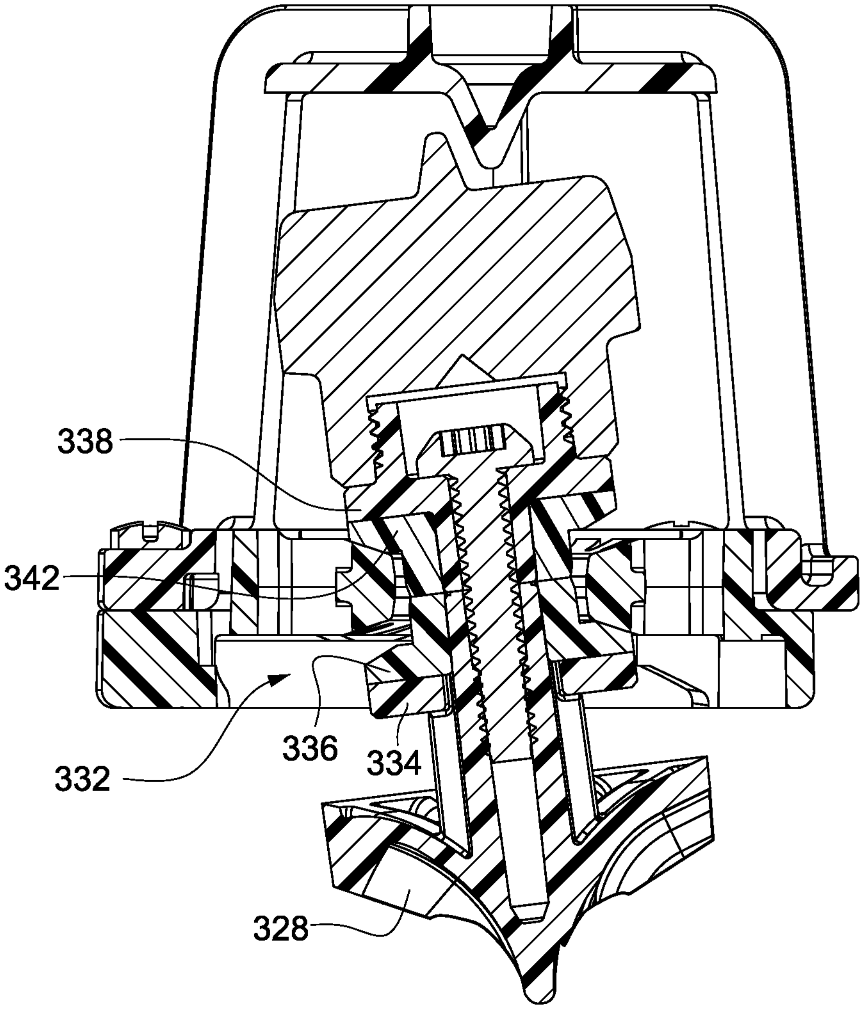
Figure 23:
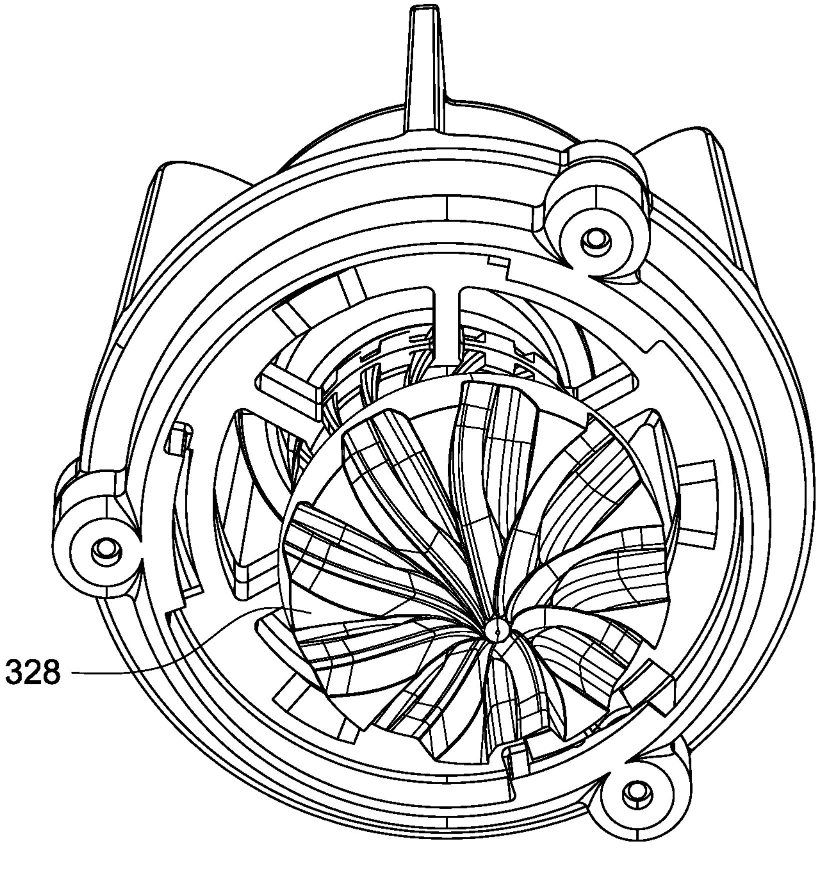

FIGS. 21-23 show an embodiment with variations to prevent insects, particularly spiders, from making nests up inside the cover. It has been discovered that spider webs for example may stall the action of the sprinkler. In this embodiment, the cover 320 has an open design with cover arms 321 to be less likely to attract spiders and other insects from nesting there. Additionally, with reference to FIG. 22, the spool assembly 332 is modified to improve wear life. Specifically, the upstream and downstream flanges are separately integrated with the bushing to define an upstream flange bushing 336 abutting the upstream spool shoulder 334 and a downstream flange bushing 342 abutting the downstream spool shoulder 338. A separate bushing has been eliminated. Still further, as shown in FIG. 23, the deflector plate 328 is modified to reduce the amount of fine mist generated, add some larger droplets and increase the radius of throw. Specifically, as compared to the deflector plates of the previously described embodiments, deflector plate 328 has fewer, but wider grooves for channeling the water, and the grooves in deflector plate 328 are elongated vertically (or axially) so the water stream is turned less abruptly as it is turned vertically.

Figure 24:
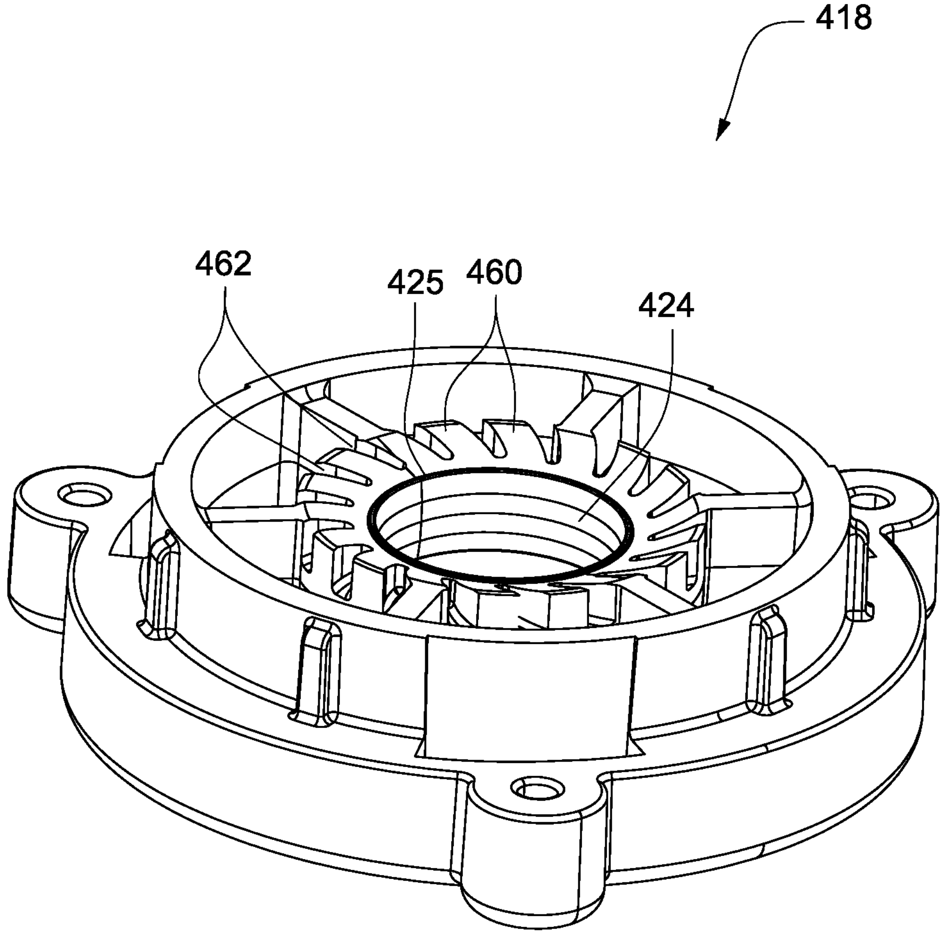
FIGS. 24-26 show an alternative cap construction with a start-up rib or lip adjacent the cap central opening.
Figure 25:
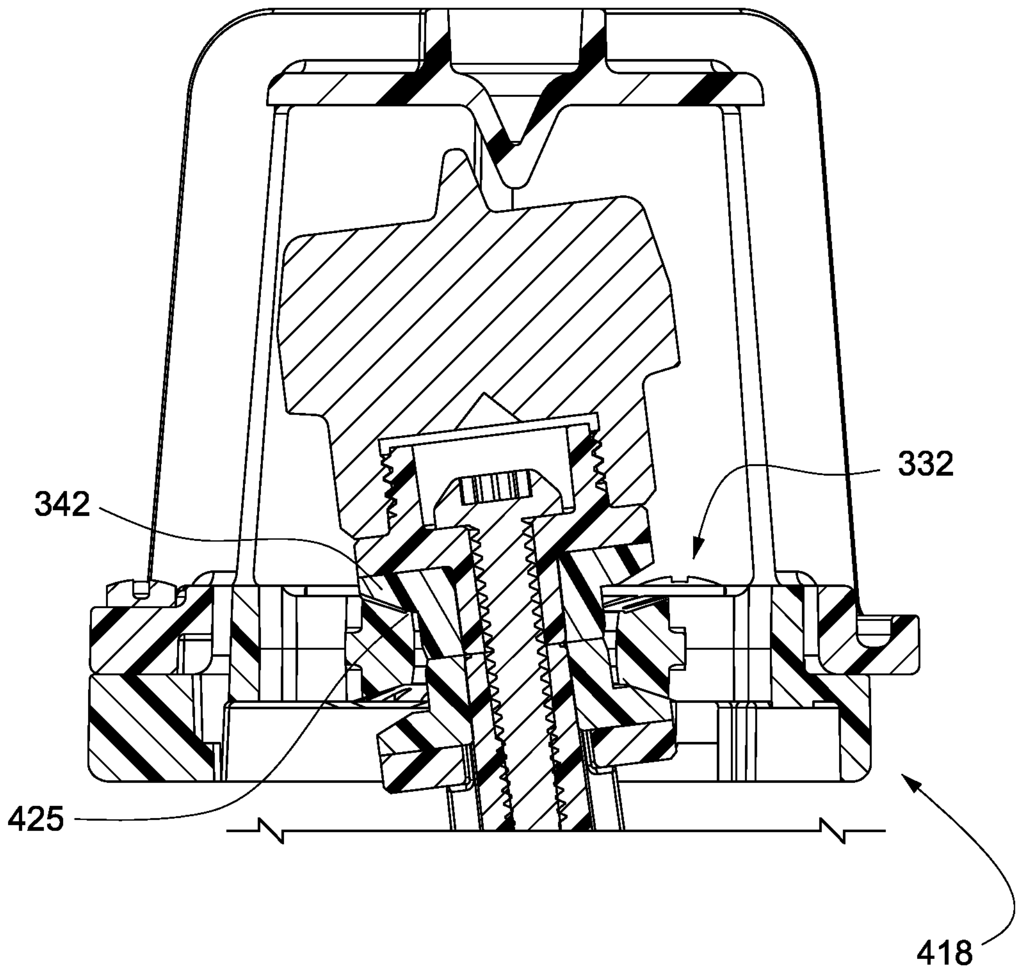
Figure 26:
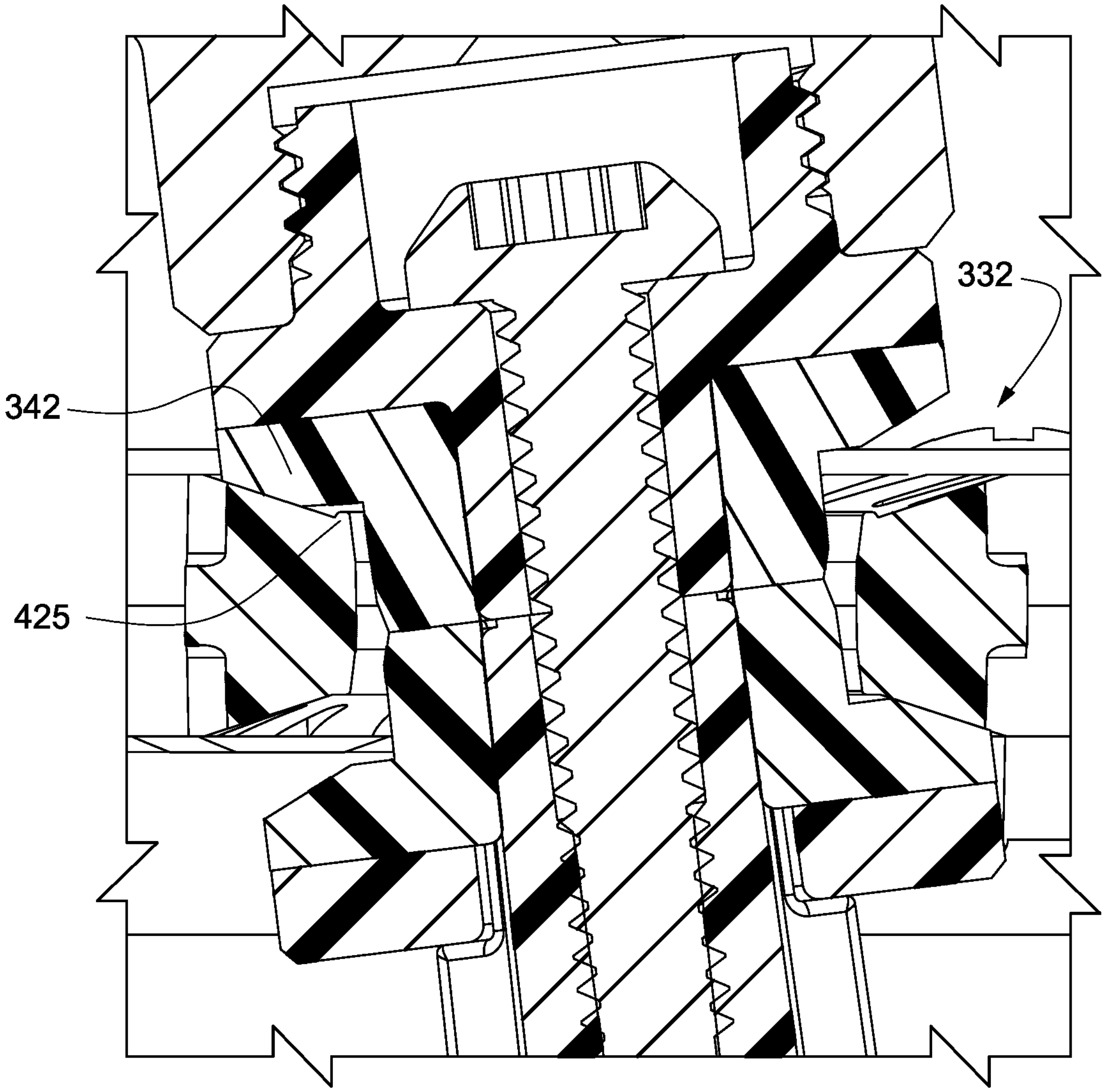

FIGS. 24-26 show an embodiment with a modified cap 418 incorporating a start-up rib or lip 425 adjacent an inside diameter of the central opening 424. FIG. 25 shows the modified cap 418 incorporated into the FIGS. 21-23 embodiment in a start-up position in which the downstream flange bushing 342 of the spool assembly 332 engages the rib or lip 425, and there is a clearance between a radially outward portion of the downstream flange bushing 342 and the traction bars 460 and debris pockets 462. FIG. 26 shows an operating position in which the downstream flange bushing 342 engages the traction bars 460 and debris pockets 462 with a clearance over the rib or lip 425. The rib or lip 425 improves start-up reliability, especially with small nozzles. The upstanding rib or lip 425 enables the spool assembly 332 to move more freely at start-up (FIG. 25), then is not contacted in the operating mode (FIG. 26).

The sprinkler assembly of the described embodiments provides an evenly-dispersed water pattern coupling rotation and orbital motion and may be rigidly mounted on a center pivot or other support structure. The assembly minimizes vibration, wear and drool while its construction reduces manufacturing costs.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sprinkler comprising:

a sprinkler body with a longitudinal axis;

a nozzle;

a deflector plate assembly secured in the sprinkler body and including a deflector plate facing the nozzle and disposed at a first outermost end of the deflector plate assembly, the deflector plate having a rotational axis, wherein the deflector plate assembly is configured for rotation on the rotational axis of the deflector plate and is configured to wobble by orbital motion about a central point of the deflector plate assembly; and a pitch member cooperable with the deflector plate assembly, the pitch member being separate from and spaced from the nozzle and separate from and spaced from the deflector plate and positioned adjacent a second outermost end of the deflector plate assembly opposite from the first outermost end, wherein the pitch member is configured to maintain the deflector plate assembly and thereby the deflector plate at an angle relative to the sprinkler body such that without the pitch member, the deflector plate assembly and the deflector plate would be unable to be maintained at the angle relative to the sprinkler body, and wherein the pitch member is a one-piece stationary member that is positioned to prevent the deflector plate assembly from assuming an orientation in alignment with the longitudinal axis of the sprinkler body in use, at rest, and when fully assembled.

2. A sprinkler according to claim 1, wherein a pivot range of the deflector plate assembly about the central point is limited by a pair of flanges associated with the deflector plate assembly.

3. A sprinkler according to claim 2, wherein the pair of flanges or a portion of the deflector plate assembly engaging the pair of flanges is formed of an elastomer.

4. A sprinkler according to claim 1, further comprising a fixed ring disposed in the sprinkler body on which the deflector plate assembly is engaged.

5. A sprinkler according to claim 4, wherein the fixed ring is part of a cap connected with the sprinkler body, the cap including a central opening, wherein the cap comprises traction surfaces surrounding the central opening on both sides thereof, and wherein the deflector plate assembly comprises a pair of flanges positioned on opposite sides of the cap, the pair of flanges engaging the traction surfaces of the cap, respectively.

6. A sprinkler according to claim 1, further comprising a cover positioned over the deflector plate assembly and secured to the sprinkler body and a counterbalance weight assembly including a housing and a counterbalance weight disposed in the housing, the cover including the pitch member disposed facing the housing, wherein the housing comprises a tab member at a distal end, the pitch member and the tab member cooperating to pitch the deflector plate assembly at the angle relative to the sprinkler body.

7. A sprinkler comprising:

a sprinkler body with a longitudinal axis;

a nozzle;

a central support secured to or integral with the sprinkler body;

a deflector plate assembly secured by the central support and including a deflector plate facing the nozzle at a first outermost end of the deflector plate assembly, the deflector plate having a rotational axis, wherein the deflector plate assembly is configured for rotation on the rotational axis of the deflector plate relative to the central support and is configured to wobble by orbital motion about a central point of the deflector plate assembly; and a pitch member configured to maintain the deflector plate assembly and thereby the deflector plate at an angle relative to the sprinkler body longitudinal axis, the pitch member being separate from and spaced from the deflector plate and positioned adjacent a second outermost end of the deflector plate assembly opposite from the first end, wherein without the pitch member, the deflector plate assembly and the deflector plate would be unable to be maintained at the angle relative to the sprinkler body, and wherein the pitch member is a one-piece stationary member that is positioned to prevent the deflector plate assembly from assuming an orientation in alignment with the longitudinal axis of the sprinkler body in use, at rest, and when fully assembled.

8. A sprinkler according to claim 7, wherein a pivot range of the deflector plate assembly about the central point is limited by a pair of flanges associated with the deflector plate assembly.

9. A sprinkler according to claim 8, wherein the pair of flanges or a portion of the deflector plate assembly engaging the pair of flanges is formed of an elastomer.

10. A sprinkler according to claim 7, wherein the central support comprises a cap with a central opening, wherein the cap comprises traction surfaces surrounding the central opening on both sides thereof, and wherein the deflector plate assembly comprises a pair of flanges positioned on opposite sides of the cap, the pair of flanges engaging the traction surfaces of the cap, respectively.

* * * * *